Figure 1:
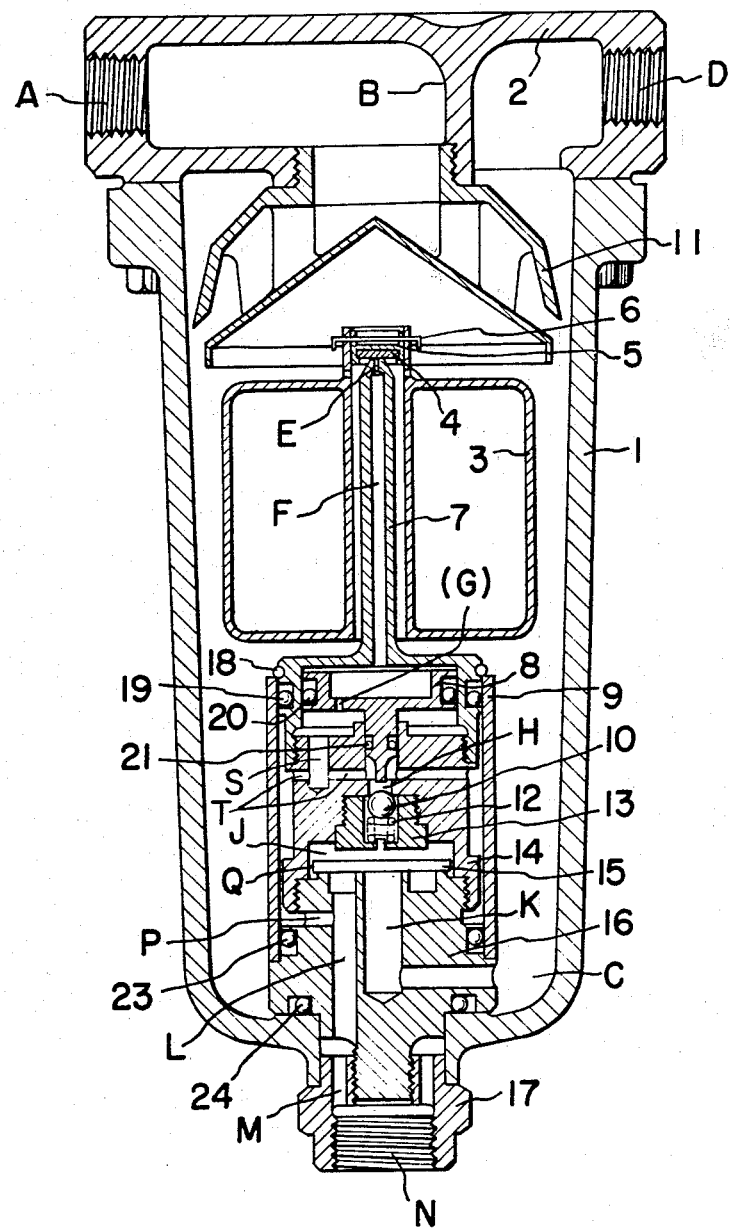

Sept. 27, 1966 KATSUJI FUJIWARA 3,275,020
AIR TRAP
Filed June 16, 1965 2 Sheets-Sheet 1

INVENTOR
KATSUJI FUJIWARA

BY *McGlew and Toren*

ATTORNEYS

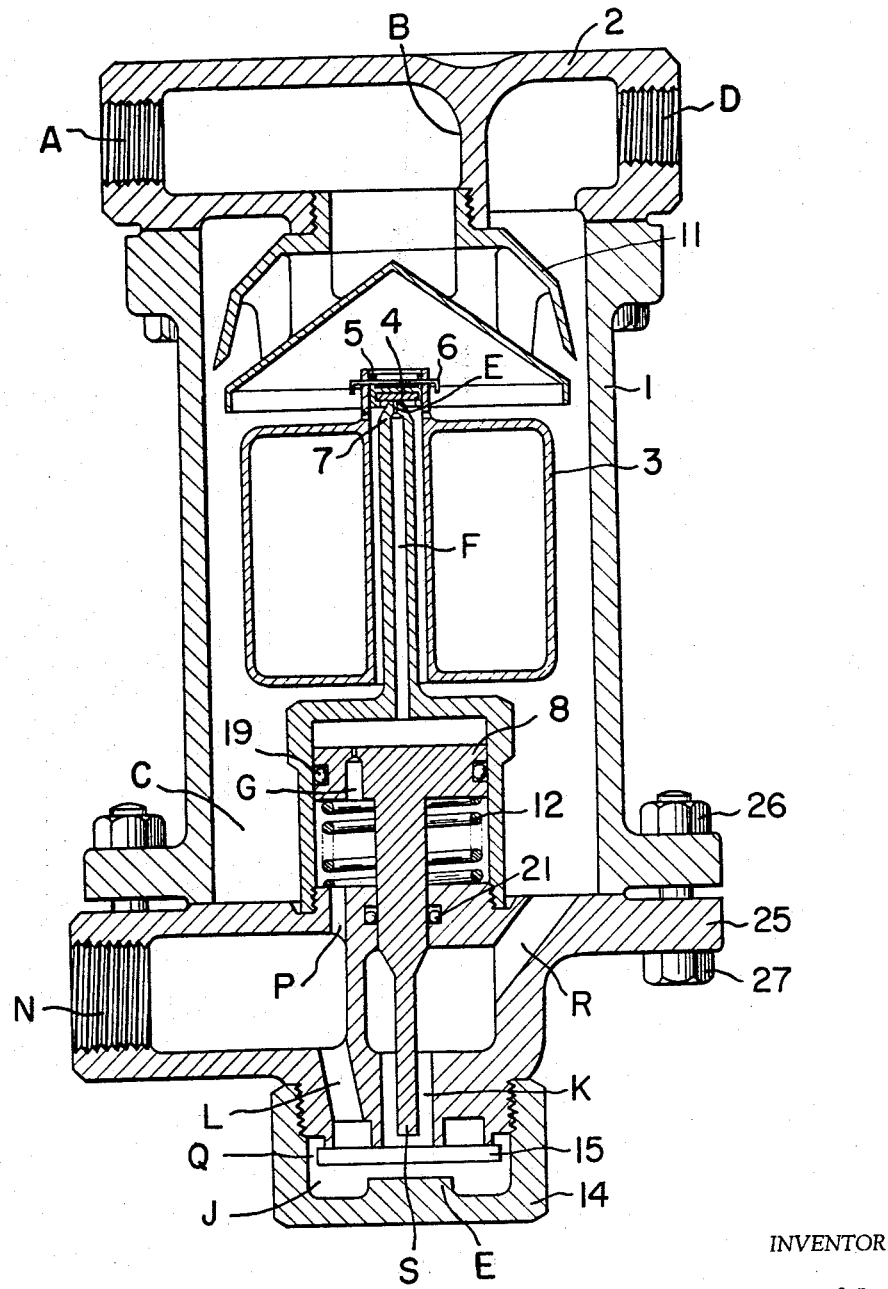

3,275,020
AIR TRAP
Katsuji Fujiwara, 191 Nishitani Hiraoka-cho,
Kakogawa-shi, Japan
Filed June 16, 1965, Ser. No. 464,463
Claims priority, application Japan, July 22, 1964,
39/42,237, 39/42,238
4 Claims. (Cl. 137—195)

This invention relates to an air trap for separating and discharging liquid from compressed air or other gas lines. A usual air trap generally has a float or a bucket by means of which a discharge valve is opened to discharge the condensate when the condensate reaches a predetermined water level. However, as soon as the condensate begins to discharge, the water level will descend below a datum line. Consequently the discharge valve will close and at the same time the discharging of condensate will stop. Consequently, only a little condensate is discharged by each operation while a large quantity of condensate is always held in the main body of the trap thus causing oil and dust to be accumulated in the main body resulting in troubles with the trap.

Moreover, once any foreign matter is caught between the valve and valve seat, the water level will descend due to the leakage of condensate, so that the foreign matter will not be removed. As a consequence, the trap will fail to obtain the water level necessary for refloating the float, and the discharge valve will not be opened. Finally, the leakage of air will follow.

Additionally, the usual air trap is provided with many sliding parts in its valve opening mechanism, and foreign matter, especially, oil, scale and packing rags, etc. mixed with the condensate, continuously flow in the neighborhood of the valve parts and block the sliding parts. As a result, the usual air trap has such defects that the performance is unstable and liable to cause trouble.

The present invention relates to an air trap including a combined float and a disk valve and has an object to obtain an air trap of high efficiency without the above mentioned defects.

In the usual air trap, both opening and closing of discharge valve are carried out by means of a discharge valve operated by a float or a bucket. However, with regard to an air trap according to the present invention, a floating disk valve is used as a discharge valve, and the closing of said valve is controlled by air or liquid flowing at the lower side of said valve. Namely, a velocity difference is caused by the difference between the coefficients of viscosity, densities, etc., of liquid and air, so that there is a pressure difference between the upper and lower faces of the floating disk, and the upper face is at a static pressure almost equal to the inlet pressure while the lower face is subjected to a dynamic pressure which depends upon the velocity difference between water and air. Namely, as the flow resistance is larger in the case of water, its velocity is comparatively lower, and accordingly the dynamic pressure is not decreased to such a degree (relative to the upper face) that the disk valve is pushed down toward its valve seat. However, when the condensate is discharged completely and replaced with air, the speed of air flowing under the disk valve will be increased by reason that the air encounters less resistance than does the condensate.

Accordingly, as the pressure at the lower side of the valve becomes considerably smaller than the static pressure at the upper side of the valve, the disk valve is pushed by the static pressure onto the valve seat.

Thus the float is forced down and the pilot valve is closed already before the discharge valve is closed, but the condensate is discharged continuously until the disk valve finishes the discharge completely regardless of the pilot valve action.

This point is of the greatest importance as compared with the usual air trap. The float does nothing but act as a signal for starting the motion, and it may be closed immediately after the pilot valve is opened. In practice, the time the pilot orifice is opened is very short and the flow volume of air is so small that there is no fear of causing damage by catching dust, etc. into the parts and no blocking of valve operation.

For an understanding of the principles of the invention, reference is made to the following description of typical embodiments thereof as illustrated in the accompanying drawings.

In FIG. 1 the pipe threads A and D are provided for connecting air inlet and outlet tubes at both ends of an air tight cover 2 which is screwed to the upper end of the main body 1. A pilot valve holder 5 for receiving a pilot valve seat 4 is fastened to the float 3 with a stop pin 6.

A valve seat member 16 is fixed to the bottom of the main body 1 with a valve seat fitting nut 17, being hermetically sealed by O-ring 24. Valve seat fitting nut 17 is provided with discharging passages M for condensate and with a thread N for connecting a discharging pipe. The upper end face of member 16 forms a valve seating surface engageable by a disk valve 15, and member 16 is formed with a spouting K connected to the condensate sump C in the main body and with a discharging passage L connected to the atmosphere. On the upper part of member 16, a pressure chamber lid 14 is screwed to form a pressure chamber J.

A small aperture H is formed centrally in the upper wall of the pressure chamber and it communicates with atmosphere. A pressure relief valve, in the form of a ball valve 10 closes aperture H under the bias of a spring 12 seated in an apertured nut 13.

A pilot valve seat member 7 is screwed to the upper part of the chamber lid 14 and a piston 8 is mounted within lid 14 and member 7. O-rings 20 and 21 are provided as air-tight seals as well as to decrease the friction in moving the piston.

A bellows or a diaphragm may be substituted for piston 8. A cylinder 9 seats on a shoulder on member 16 and embraces the pressure chamber forming parts as well as the part 7. Cylinder 9 is held in position by a snap ring 18 and the inner space of the cylinder is sealed by O-rings 19 and 23. The cylinder interior is thus sealed from sump C and is connected by a passage P to the discharge passage L of valve seat member 16 and thus to passages M.

Now the mode of working of the air trap will be explained as follows:

The water containing air coming from the air inlet A strikes against the barrier wall B, whereby the separated water is accumulated in the condensate sump C at the lower part of the main body 1.

On the one hand, the separated air is fed from the air outlet D to an air-employing-machine or instrument.

Thus, when the water collected in the condensate sump C reaches a certain preset water level, the float 3 will rise upward and the pilot orifice E at the top of the pilot valve 7 will be opened. Then the air will be introduced to the upper face of the piston 8 through the opened pilot orifice E and the passage F, the piston 8 will be pushed down by the pressure difference relative to the atmospheric pressure which is acting on the lower side of the piston 8, the hole H will be opened by pushing down the ball valve 10 by the piston 8 and the air in the pressure chamber J will be discharged. Accordingly, the pressure in the pressure chamber J decreases and the disk valve 15 is pushed up and opened by the pressure acting on the lower face of the valve facing the spouting passage K, and the water is discharged to the outlet N through the discharging passage L and the passages M. The water collected in the condensate sump C discharges continuously under the aforesaid action and when the discharging is completed at a preselected water level, the float 3 will descend and close the pilot valve orifice E. Then the pressure acting on the upper face of the piston 8 is released to the outside of the vessel through the hole G ad the passage P. Thus the pressure in said chamber decreases, and the spring 12 pushes up the piston 8 and the ball 10 to its valve seat, closing the orifice H.

On the one hand, when the water in the condensate sump C is discharged completely and the air flows into the spouting passage K instead of the condensate, the air will flow into the pressure chamber J through the gap Q at the periphery of the disk valve 15 and act on the upper face of the disk valve 15 as a static pressure. Here, the velocity of air flowing under the disk valve 15 becomes larger as compared with the case of water, and its pressure energy is changed into the velocity energy, so that the pressure under the disk valve becomes smaller than that above the disk valve 15; then the disk valve 15 is pushed down to its closing position by the action of the pressure difference between the pressures above and under the disk valve and the operating cycle is completed.

When condensate again collects in sump C to an extent such as to attain a predetermined level, float 3 is lifted and the condensate discharging operation is carried out in the manner just described. By repeating these operations the water is removed from the air lines.

As a modification of an air trap according to the present invention as shown in FIG. 2, it is possible to provide a disk valve 15 at the lower part, to be opened directly by the piston 8.

When float 3 rises due to increase in the condensate level, pilot valve 4 secured to the float disengages valve seat E and air under pressure is effective on the upper side of piston 8 through a passage F, thereby moving the piston downwardly. As a result, a piston rod S pushes a disc valve 15 downwardly so that condensate within sump C will flow through passages R, K, and L to be discharged through an outlet N. As soon as the condensate discharge begins, the condensate level within the sump falls to lower the float and the pilot valve 4 closes port E. Since the upper side of the piston is in communication with outlet N through a small aperture G and a further passage P, both surfaces of the piston will be under atmospheric pressure. Thus, piston 8 is raised by spring 12. However, so long as condensate remains in the sump, valve 15 remains opened. As soon as the condensate is completely discharged and air begins to flow out through outlet N, valve 15 will be immediately closed. At this instant, the compressed air fills pressure chamber J before the valve closed and, when valve 15 is closed, this air under pressure presses the valve against its valve seat.

Now the merits of air trap according to the present invention are enumerated as follows:

(1) When the condensate which is collected in the main body 1 reaches a certain preset water level the float 3 is raised and the disk valve 15 is opened as described. Thereupon the condensate begins to be discharged, and the float 3 will sink immediately so the ball valve 10 is closed, but the discharging of the condensate is continued regardless of this action of the ball valve until the discharging is completed. Namely, the float 3 gives only a signal for valve opening and has nothing to do with the valve closing; and the closing of valve is carried out automatically by another means. The usual air trap, whereby the opening or the closing of valve is effected by the condition whether the water level exceeds the datum line or not has very unstable performances.

(2) As is clear from the aforesaid explanation, the condensate sump C is empty at every operation. The usual air trap has always much condensate, and besides only a small amount of condensate is discharged each time, so that oil and the like remain in an upper layer and finally oil and the like fill the trap, which will sometimes cause troubles. In an air trap according to the present invention, there is no such trouble as explained above, and only little dust and foreign matters are found, so that hardly any trouble is caused.

(3) When any dust is caught in the discharge valve, the pressure in the pressure chamber is decreased due to leakage, so that the disk valve 15 is opened by air pressure acting through the spouting passage, and the dust is blown off by the condensate or air jet. Thus the discharge valve is restored to its normal condition so that the trap will not blow off permanently, as is the case with the usual air trap.

(4) The period of pilot valve opening is very short and the flow amount of air is little so that there is no fear of causing trouble by sucking dust in the hole of the pilot valve, so that no blocking of motion is caused:

I claim:

1. An air trap for discharging liquid separated from compressed gas lines, such as compressed air lines, said air trap comprising, in combination, a housing including an inlet for liquid-containing compressed gas, a gas outlet, a liquid discharge outlet and a liquid sump in communication which said inlet; a floating disc valve controlling communication between said sump and said liquid discharge outlet, and subjected on one surface to air under pressure and on its other and seating surface to liquid in said sump; float means displaceable in said sump in accordance with the liquid level therein; means, including said one surface of said disc valve, defining a pressure chamber normally containing gas under pressure; gas pressure responsive operating means operable to open said disc valve; means biasing said operating means to an inactive position in which it is ineffective on said disc valve; a normally closed pilot valve controlling communication between said sump and said operating means; and gas bleed-off means connecting said operating means to said liquid discharge outlet; said float, when the liquid in said sump attains a first predetermined level, opening said pilot valve for the gas pressure in said sump to actuate said operating means to open said disc valve to connect said sump to said liquid discharge outlet and, when the liquid in said sump falls to a second predetermined level, closing said pilot valve for bleeding of gas from said operating means for movement thereof to its inactive position by said biasing means; said disc valve, when said sump is substantially emptied of liquid, being subjected to gas flow over said one surface to increase the pressure in said chamber, for biasing of said disc valve to the closed position by the pressure difference corresponding to the difference in velocity between flowing gas and flowing liquid.

2. An air trap, as claimed in claim 1, including a pressure relief valve controlling release of pressure from said chamber; said biasing means biasing said pressure relief valve to the closed position and said operating means being operable to open said pressure relief valve; said pressure relief valve, when operated by said operating means, releasing pressure from said chamber for opening of said disc valve to connect said sump to said liquid discharge outlet and, when the liquid in said sump falls to said second predetermined level, said bleeding of gas from said operating means resulting in movement of said operating means to its inactive position by the biasing means through said pressure relief valve.

3. An air trap, as claimed in claim 2, in which said operating means comprises a piston having a surface subject to gas pressure upon opening of said plot valve and having a valve operating stem projecting from said piston to engage and open said pressure relief valve; said biasing means comprising spring biasing means.

4. An air trap, as claimed in claim 1, in which said operating means comprises a piston subjected to gas pressure upon opening of said pilot valve and a stem extending from said piston and engageable with said disk valve to open the same; said biasing means comprising a spring biasing means.

References Cited by the Examiner
UNITED STATES PATENTS

| | | | |
|---|---|---|---|
| 2,726,732 | 12/1955 | Faust | 137—195 X |
| 2,744,534 | 5/1956 | Faust | 137—195 |
| 2,817,353 | 12/1957 | Midgette | 137—200 X |
| 2,998,825 | 9/1961 | Gleason | 137—195 |

WILLIAM F. O'DEA, *Primary Examiner.*

ALAN COHAN, *Examiner.*